358-75 SR
F337S XR 3,886,309

United States Patent [19]

Mason

SUBSTITUTE FOR MISSING COPY

[11] 3,886,309
[45] May 27, 1975

[54] FLAT BED FACSIMILE SCANNERS

[75] Inventor: Peter John Mason, Ontario, N.Y.

[73] Assignee: Xerox Corporation, Stamford, Conn.

[22] Filed: May 17, 1973

[21] Appl. No.: 361,387

Related U.S. Application Data

[63] Continuation-in-part of Ser. No. 227,939, Feb. 22, 1972, abandoned.

[52] U.S. Cl. ............... 178/7.6; 178/5.4 ES; 178/7.6
[51] Int. Cl. ........................ H04n 1/10; H04n 3/02
[58] Field of Search .... 178/5.4 ES, 5.4 PD, 5.4 ML, 178/7.1, 7.6, 7.7, DIG. 27, DIG. 28; 346/76 L; 350/181

[56] References Cited

UNITED STATES PATENTS

| | | | |
|---|---|---|---|
| 3,191,488 | 6/1965 | Eisner | 350/181 |
| 3,349,174 | 10/1967 | Warschauer | 178/5.4 ES |
| 3,448,458 | 6/1969 | Carlson et al. | 346/17 |
| 3,614,312 | 10/1971 | Fournier et al. | 178/7.3 R |
| 3,621,133 | 11/1971 | Baker et al. | 178/7.3 |
| 3,670,099 | 6/1972 | Oliver | 178/6 |
| 3,751,138 | 8/1973 | Humphrey | 350/181 |
| 3,795,768 | 3/1974 | Locke | 178/7.6 |

*Primary Examiner*—Harvey E. Springborn
*Assistant Examiner*—Michael Sachs

[57] ABSTRACT

A flat bed facsimile scanner comprises a galvanometer driven mirror for sweeping a convergent light beam of elliptical cross-section from end-to-end of a line-like scanning station, together with a scan line length photo transducer in parallel alignment with the scanning station. The light beam is supplied by a laser and is subsequently shaped by an anamorphic lens to provide an elliptical scanning spot. Subject copy is incrementally advanced transversely of the scanning station at a rate which is an integer multiple of the scanning frequency. The depth of focus for the scanning spot is at least equal to the difference between the longest and shortest of the optical paths for the light beam, and the locus of the beam focus is substantially equidistant from the center and ends of the scanning station.

19 Claims, 2 Drawing Figures

TX 358-75 Rn

FLAT BED FACSIMILE SCANNERS

CROSS REFERENCE

This application is a continuation-in-part of my copending and commonly assigned U.S. patent application Ser. No. 227,939, filed Feb. 22, 1972, now abandoned, on "Laser Scanner."

BACKGROUND OF THE INVENTION

This invention relates, generally to flat bed scanners and, more particularly, to flat bed facsimile scanners relying on spot-type projection techniques.

Modern facsimile transmitters and transceivers normally comprise photoelectric scanners for serially converting the information content of a subject copy into a corresponding video signal. As a general rule, the subject copy is more or less opaque, and the video signal is generated by a photoelectric transducer in response to light reflected or "bounced" from the information bearing surface of the subject copy. Substantially, the same arrangement may be used for scanning transparencies that are backed by a white or grey neutral background color. Or, as an alternative, the photoelectric transducer of a transparency scanner may be positioned to intercept light transmitted thereto through the transparency. In either instance, a substantially constant intensity light source illuminates the subject copy so that there is a close correlation between the intensity of the light incident on the transducer and the information content of the subject copy.

There are several commonly recognized classifications for facsimile scanners. Some are known as flat bed scanners because the subject copy is supported on a substantially flat scanning platen or the like, while others are known as cylinder or drum-type scanners because the subject copy is wrapped around a drum or otherwise curved to form a cylinder or partial cylinder. Another of the traditional distinctions is between scanners that employ flood projection techniques and those that rely on spot projection. In units employing flood projection, light from the floodlit copy surface is projected to the transducer through an aperture so that the effective scanning spot size is limited as necessary to obtain a reasonable resolution. Contrariwise, in scanners relying on spot projection, only a limited area or spot on the subject copy is illuminated at any given time, thereby permitting the desired resolution to be achieved even though the light from the subject copy is directly picked-up by the transducer without the intervention of an aperture.

As will be appreciated one of the principle advantages of spot projection over flood projection is that spot projection leads to a more efficient utilization of the available light and is, therefore, compatible with the use of a relatively low power light source. Moreover, experience has demonstrated that flat bed scanners are significantly easier to load and unload than cylinder or drum-type units, especially when the loading and unloading of subject copy is to be carried out automatically.

Indeed, others have previously recognized the characteristic advantages of flat bed facsimile scanners, and particularly, of those that employ spot-type projection techniques, but the prior attempts to provide such a scanner have not been altogether successful. Apart from CRT scanners, which tend to be bulky and relatively expensive, difficulty has been experienced in maintaining the intensity and area of the spot impinging on the subject copy independent of the position of the spot relative to the subject copy. Typically, the manifestation of this problem is that the intensity of the scanning spot tends to decrease while its area tends to increase as the scanning spot moves away from the center of a scan line toward either end thereof. Additionally, problems have also been encountered with variations in the intensity of the light incident on the photoelectric transducer as a function of the position of the scanning spot. For example, the intensity of the light reflected from or transmitted through a uniformly illuminated subject copy sometimes appears to fall off as a function of the distance of the scanning spot from the center of a scan line when measured at the transducer.

SUMMARY OF THE INVENTION

One of the broader aims of this invention is to provide a relatively compact and economical flat bed scanner with spot projection to supply a scanning spot of substantially constant intensity and area. A somewhat more specific, but at least equally important, aim is to provide a flat bed facsimile scanner with spot projection wherein the intensity of the light incident on the photoelectric transducer is substantially solely dependent on the information content of the subject copy.

In keeping with those aims, one of the objects of the present invention is to provide a flat bed facsimile scanner with spot projection of a scanning spot having a substantially constant intensity and area despite variations in the length of the optical path for the scanning spot. A more detailed related object is to provide a flat bed facsimile scanner having an electromechanical deflection mechanism for spot projection of a scanning spot having a substantially constant intensity and area.

Another object of this invention is to provide a flat bed facsimile scanner having spot projection of a scanning spot which is substantially immune to normal variations in the length of the optical path from the source to the subject copy and in which the distance from the subject copy to the photoelectric transducer is substantially constant.

To carry out these and other objects of the present invention, there is a flat bed facsimile scanner comprising an electromechanical deflection mechanism for scanning a collimated light beam from end-to-end of a line-like scanning station and a scan line length photoelectric transducer in parallel alignment with the scanning station. The depth of focus of the beam is at least equal to the difference between the longest and the shortest of the optical paths for the beam, and the locus of the beam focus is substantially equidistant from the center and ends of the scanning station.

BRIEF DESCRIPTION OF THE DRAWINGS

Still further advantages and features of this invention will become apparent when the following detailed description is read in conjunction with the attached drawings, in which.

DETAILED DESCRIPTION OF THE ILLUSTRATED EMBODIMENT

While the invention is described hereinafter in some detail with specific reference to an illustrated embodiment, it is to be understood that there is no intent to limit it to that embodiment. On the contrary, the invention is to cover all modifications, alternatives and equivalents falling within the spirit and scope of the invention as defined by the appended claims.

Figure 1:
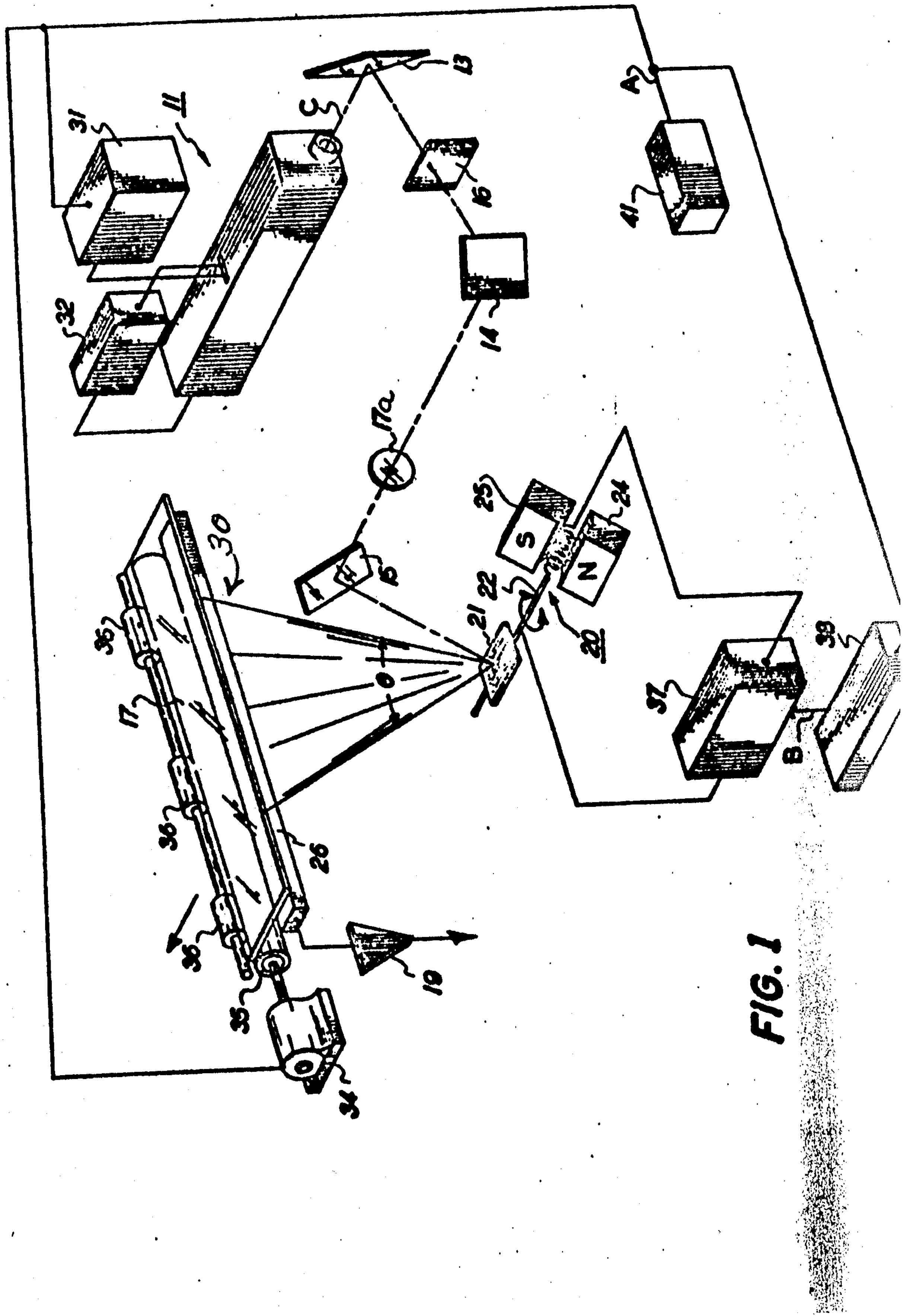
FIG. 1 is a simplified perspective view of a flat bed facsimile scanner constructed in accordance with the present invention.

Turning now to the drawings, and at this point especially to FIG. 1, it will be seen that the facsimile scanner there shown comprises an oscillatory mirror 21 for deflecting a substantially collimated light beam from end-to-end of a line-like scanning station 30. The scanning station 30 is defined by a more or less conventional flat bed platen or the like (not shown), and subject copy 17 is advanced transversely of the scanning station 30 in the direction of the arrow. An example of the details of scanning station 30 is found in U.S. application, Ser. No. 253,828, filed on May 16, 1972, entitled "Facsimile Scanning Apparatus," now allowed, and assigned to the assignee of this invention. Accordingly, the surface area of the subject copy 17 is scanned by a spot of light in accordance with a predetermined scanning pattern.

In keeping with one of the important aspects of the present invention, the light beam is supplied by a laser 11 and is shaped by a lens 17*a* to provide a substantially elliptical scanning spot. An example of the details of laser 11 is found in U.S. Pat. No. 3,395,367, entitled "Helium Neon Laser," and of lens 17*a* in U.S. pat. No. 3,751,138 entitled "Variable Anamorphic Lens And Method For Constructing Lens." The focal distance for the scanning spot is selected so that the locus of the focus defined as the beam is deflected by the oscillatory mirror 21 is substantially equidistant from the center and ends of the scanning station 30. Additionally, the depth of focus for the scanning spot is selected to be at least as great as the difference between the longest and the shortest of the optical paths for the light beam. As a practical matter, facsimile scanners such as here disclosed are tolerant of variations on the order of about ±10 per cent in the area of the scanning spot. Depth of focus is, of course, a measure of that range over which there are no significant variations in an image. Thus, it will be understood that references herein to the depth of focus of the scanning spot designate that range within which the area of the scanning spot is substantially constant or, in other words, within about ±10 percent of the nominal area thereof as measured at the focal point.

The laser 11 characteristically emits a substantially collimated beam C of coherent light, but the emitted beam C normally has an essentially circular cross-section. Experience has demonstrated that a circular scanning spot is less than ideal for facsimile scanning. If the diameter of such a scanning spot is selected to ensure coverage of the spaces between the centers of adjacent scan lines, the resolution achievable in the line scanning direction (say, the horizontal direction) suffers. If, on the other hand, the diameter of a circular scanning spot is selected for normal resolution in the line scanning direction (e.g., 96 lines/inch) there often is incomplete coverage of the spaces between the centers of adjacent scan lines. In that event, the quality of the facsimile copy is degraded because of a readily apparent scan structure. Thus, the lens 17*a* is positioned in the optical path for the light beam C to provide a substantially elliptical scanning spot having a major axis oriented transversely of the line scanning direction to optimize the coverage of the spaces between the centers of adjacent scan lines and a minor axis oriented in the line scanning direction to optimize the resolution achievable in that direction. For example, the lens 17*a* is suitably an anamorphic lens having non-equal, orthogonally related focal distances. In one embodiment of the scanner, the laser 11 supplies a circular cross-section beam C with a diameter of approximately 3.52 mm. and the anamorphic lens 17*a* has focal distances of 34 inches and 37 inches in 90° opposed planes to provide an elliptical scanning spot nominally measuring 0.020 inches along its major axis and 0.010 inches along its minor axis. That scanning spot has been successfully utilized to achieve resolutions of 96 lines/inch vertically by 96 lines/inch horizontally, 64 lines/inch vertically by 96 lines/inch horizontally and 77 lines/inch vertically by 80 lines/inch horizontally.

As will be appreciated, the physical space necessary to accomodate the scanner may be reduced by using suitable fixed mirrors 13–15 to redirect the collimated light beam, and the intensity of the beam may be reduced when desired by employing an optical filter 16. In the illustrated embodiment, the filter 16 is interposed between the mirrors 13 and 14 which, in turn, are in series at the input side of the lens 17*a*. The mirror 15, on the other hand, is positioned at the output side of the lens 17*a* to reflect the cross-sectionally shaped light beam onto the oscillatory mirror 21. Preferably, the energy level of the light beam emitted by the laser 11 is stabilized so that the scanning spot has a substantially constant intensity. To that end, the lasser 11 may advantageously be equipped with a stabilizing feedback circuit 32, such as is described and claimed in a commonly assigned, copending U.S. patent application of David R. Shuey, Ser. No. 239,144, filed Mar. 29, 1972, on "Laser Power", abandoned in favor of continuing application Ser. No. 429,246 filed Dec. 28, 1973, entitled "Laser Stabilization Technique."

As shown, there is a periodic signal source 38 for energizing a moving coil-type galvanometer 20 to oscillate the mirror 21 through an angle $\theta$, thereby cyclically deflecting the scanning spot from one end to the other of the scanning station 30. As will be appreciated, there are unadvoidable variations in the length of the optical path for the scanning beam. For example, the ends of the scanning station 30 are typically further from the mirror 21 than the center. Nevertheless, the scanning spot incident on the subject copy 17 has a substantially constant area and intensity because, as previously mentioned, the locus of the focus for the scanning spot is selected to be substantially equidistant from the center and both ends of the scanning station 30 and the depth of focus for the scanning spot is selected to be at least as great as the difference between the longest and the shortest of the optical paths for the scanning beam.

More particularly, in the illustrated embodiment, the galvanometer driver 20 includes a wire for supporting the mirror 21 and the coil 22. A pair of oppositely polarized permanent magnet pole pieces 24 and 25 are mounted near the coil which, in turn, is suspended in the magnetic field created by the pole pieces 24 and 25 and is coupled to the signal source 38 by a current amplifier 37 or the like. In operation, the coil 22 is biased toward an equilibrium position by a restoring force. But, when the current flowing through the coil 22 is varied, the aforementioned magnetic field causes the coil 22 to rotate with the result that the coil 22 is angularly displaced from its equilibrium position by an angle which is directly proportional to the magnitude of any such current flow.

Preferably, the signal source 38 is a periodic ramp function generator, such as is described and claimed in a commonly assigned, copending U.S. patent application of Roy W. Rivers, Ser. No. 227,999, filed Feb. 22, 1972, on "Integrating Digital to Analog Converter", abandoned in favor of continuing application Ser. No. 432,933, filed Jan. 14, 1974. The advantages of using a periodic ramplike function to drive the galvanometer 20 are that a relatively uniform scan rate and a relatively short retrace or "flyback" period can be achieved. To accomodate such a drive signal, the equilibrium position of the coil 22 is selected so that the scanning beam is deflected toward the center of the scanning station 30 under quiescent conditions, and the peak amplitude of the ramp function is selected so that the coil is angularly displaced from its equilibrium position by the angle. When the ramp function is at its peak amplitude, the scanning beam is deflected toward the right-hand end of the scanning station 30 and when the ramp is at a minimum the beam is deflected to the left-hand end.

Suitably, the subject copy 17 is incrementally advanced transversely of the scanning station 30. To accomplish that, there is a stepping motor 34 coupled to drive a roller 35, and the subject copy 17 is threaded between the driven roller 35 and a segmented idler roller 36. Compatability with existing drum and cylinder-type facsimile receivers and transceivers can be achieved by advancing the subject copy 17 several steps during each scanning cycle so that the scanning is carried out in accordance with a scanning pattern which approximates the characteristic helical scanning pattern of a drum or cylinder-type unit. The degree of the approximation, of course, depends on the size and the number of steps/scan cycle, but those details are beyond the scope of this disclosure inasmuch as they are slaved to the specifics of the units with which compatability is to be achieved.

Figure 2:
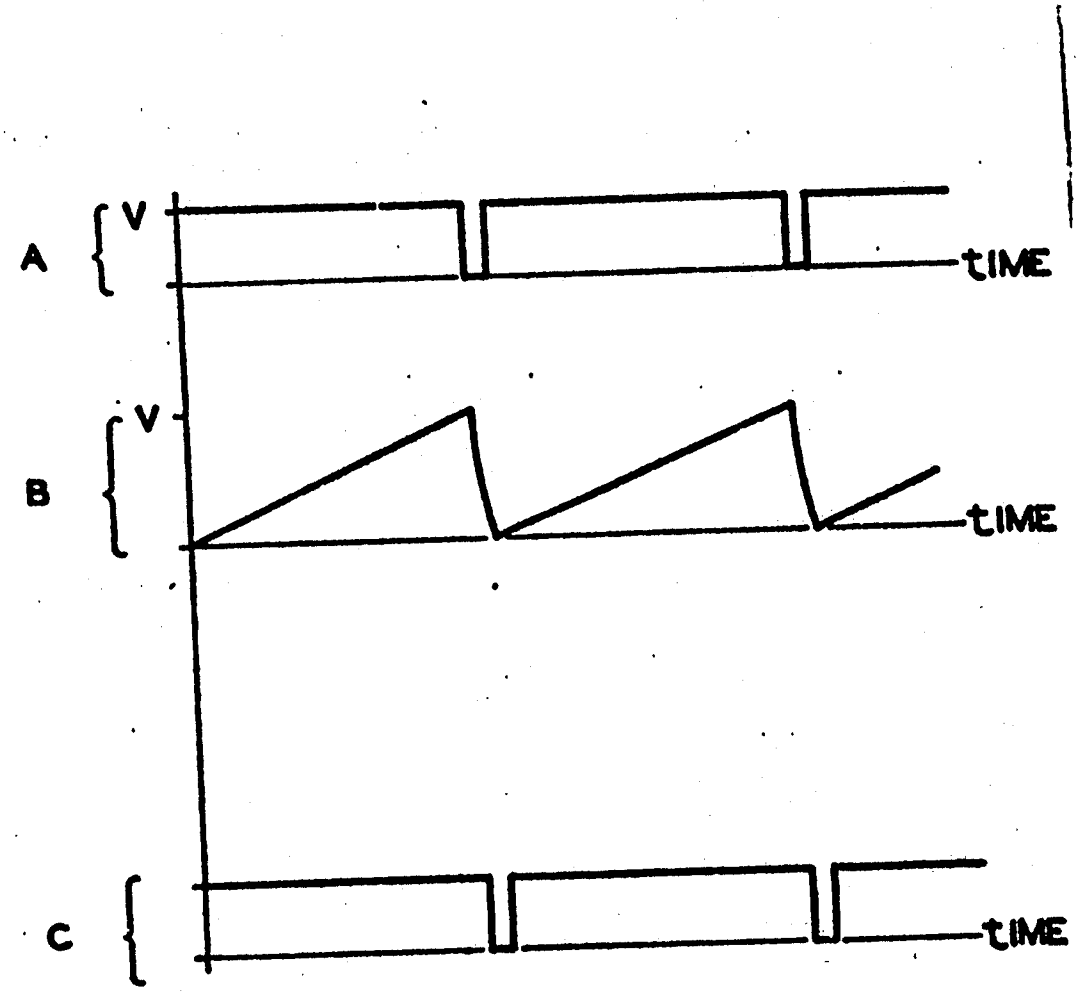
FIG. 2 is a timing chart which illustrates the interrelationship between various electrical and optical signals occurring in the scanner shown in FIG. 1.

Referring additionally to FIG. 2, it will be seen that there is source 41 for supplying a train of clock pulses A which are applied to the stepper motor 34 and to the ramp function generator 38. The repetition rate of the clock pulse A determines the rate at which the subject copy 17 is advanced and the frequency of the ramp function B provided by the signal source 38, while the magnitude of the clock pulses A determine the slope of the ramp function B. The frequency and slope of the ramp function B, in turn, determine the scanning frequency and the scan rate, respectively. The clock pulses A are also applied to a modulator 31 to reduce the energy content of the beam C emitted by the laser 11 to a relatively low level in time coincidence with the scan "flyback" or retrace intervals, thereby precluding spurious "re-scanning" of the subject copy 17. As shown, the modulator 31 is coupled to the laser 11 to control the energy level of the emitted beam C by means of a cavity or discharge current modulation technique.

In accordance with another of the important aspects of this invention, there is a scan line length photoelectric transducer 26 in parallel alignment with the scanning station 30 to generate a video signal representative of the information content of the subject copy 17. As illustrated, it has been assumed that the subject copy 17 is more or less opaque and, therefore, the photoelectric transducer 26 is shown as being positioned to intercept light diffusely reflected or "bounced" from the information bearing surface of the subject copy 17. The intensity of the diffusely reflected light depends on the gray-scale shading of the particular spot being scanned. Specifically, the intensity of the reflected light is highest when white areas are being scanned, lowest when black areas are being scanned, and in an intermediate range when areas with various shades of gray are being scanned. Notably, the parallel alignment of the scan line length photoelectric transducer 26 effectively guarantees that the length of the optical path for light reflected from the subject copy 17 is constant, thereby enabling the transducer 26 to generate a video signal which depends substantially only on the information content of the subject copy 17. Suitably, the photoelectric transducer 26 is a silicon photodiode and the video signal generated thereby is fed to further circuitry (not shown) through an amplifier 19.

CONCLUSION

In view of the foregoing, it will now be understood that a flat bed scanner with spot projection of a scanning spot having a substantially constant area and intensity has been provided by this invention. Also, it will be appreciated that the scanner is particularly suitable for applications to the facsimile art when used with a scan line length photoelectric transducer and that substantial enhancement of the scanner is realized in such applications by employing an elliptical scanning spot.

What is claimed is:

1. A flat bed scanner for scanning subject copy, said scanner comprising the combination of
   - means for supplying a substantially collimated beam of light;
   - an optical path for said light beam;
   - deflection means in said optical path for sweeping the light beam from end-to-end of a scanning station, whereby a scanning spot of light is projected onto said subject copy while said optical path is varied in length; and
   - lens means in said optical path for shaping said scanning spot and providing said spot with a depth of focus at least as great as the difference between the longest and shortest lengths of said optical paths so that the spot of light projected onto said subject copy has a substantially constant area.

2. A scanner in accordance with claim 1 wherein said light beam is supplied by a laser and initially has a substantially circular cross-section and said lens means is further adapted to modify the cross-section of said light beam so that said scanning spot is substantially elliptical with a minor axis in parallel alignment with said scanning station and a major axis oriented perpendicularly to said scanning station.

3. A scanner in accordance with claim 2 wherein said lens means is interposed between said laser and said deflection means and includes an anamorphic lens for elliptically shaping said scanning spot and for focusing said scanning spot at a predetermined focal distance, said focal distance being selected so that a locus of the points in said optical path at the focal distance from said lens means is substantially equidistant from the ends and center of said scanning station and within said depth for focus of all points of said scanning station.

4. A scanner in accordance with claim 2 further including means for advancing said subject copy transversely of said scanning station at a predetermined rate, and wherein said deflection means cyclically sweeps said light beam from one end to the other of said scanning station at a predetermined frequency, whereby said subject copy is scanned in accordance with a predetermined scanning pattern.

5. A scanner in accordance with claim 4 further including means coupled to said laser for stabilizing the light beam at a predetermined energy level while said beam is sweeping from said one end to said other end of said scanning station, whereby the intensity of the scanning spot is substantially constant.

6. A scanner in accordance with claim 5 wherein each cycle of said deflection means includes a predetermined flyback interval, and further including means coupled to said laser for reducing the energy level of said light beam to a relatively low level during each such flyback interval.

7. A scanner in accordance with claim 6 wherein said deflection means includes a flat mirror and a galvanometer-type driver coupled to said mirror for oscillating said mirror through a predetermined angle and about a fixed axis of rotation.

8. A scanner in accordance with claim 7 wherein said lens means focuses said scanning spot at a predetermined distance from the axis of rotation of said mirror, whereby a locus of the focus is generated as said mirror is oscillated, said focus distance being selected so that the entirety of said scanning station is within the depth of focus for the scanning spot and so that the scanning station has each of its ends and its center substantially equidistantly spaced from said locus.

9. A scanner in accordance with claim 8 wherein said lens means includes an anamorphic lens for elliptically shaping the cross-section of said light beam.

10. A flat bed facsimile scanner for converting information borne by a subject copy into a corresponding video signal, said scanner comprising the combination of means for supplying a substantially collimated beam of light;

an optical path for said light beam;

deflection means in said optical path for sweeping said light beam from end-to-end of a scanning station thereby projecting a spot of scanning light onto said subject copy while causing lengthwise variations in said optical path;

lens means in said optical path for shaping said scanning spot and providing said spot with a depth of focus at least as great as the difference between the longest and shortest lengths of said optical paths so that said scanning spot has a substantially constant area; and photoelectric transducer means in parallel alignment with and extending substantially from end-to-end of said scanning station for intercepting light transmitted from said subject copy in response to said scanning spot to thereby generate a video signal corresponding to the information borne by subject copy.

11. A facsimile scanner in accordance with claim 10 wherein a scan line of predetermined length is defined as said beam is swept from end-to-end of said scanning station, and said transducer means includes a photoresponsive diode having a length at least equal to the length of said scan line, with said diode being positioned in parallel alignment with said scanning station.

12. A facsimile scanner in accordance with claim 11 wherein said lens means is further adapted for focusing said scanning spot at a predetermined distance beyond said deflection means whereby a locus of the focus for said scanning spot is generated as said beam is swept from end-to-end of said scanning station; said station having its ends and center equidistantly spaced from said locus, with the distance between the locus and the scanning station never exceeding the depth of focus for the scanning spot.

13. A facsimile scanner in accordance with claim 12 wherein said light beam is supplied by a laser and initially has a substantially circular cross-section, and said lens means includes an anamorphic lens for shaping said light beam so that said scanning spot is substantially elliptical with a minor axis in parallel alignment with the scanning station and a major axis oriented perpendicularly relative to the scanning station.

14. A facsimile scanner in accordance with claim 13 wherein said deflecting means repeatedly and periodically sweeps said light beam from one end to the other of said scanning station at a predetermined scanning frequency, and further including means for advancing said subject copy transversely of said scanning station at a fixed rate, whereby said subject copy is scanned in accordance with a predetermined scanning pattern.

15. A facsimile scanner in accordance with claim 14 wherein said subject copy is incrementally advanced transversely of said scanning station in steps of equal length and predetermined repetition rate, said repetition rate being selected to be an integer multiple of said scanning frequency, whereby a helical scanning pattern is approximated.

16. A facsimile scanner in accordance with claim 10 wherein the light beam is supplied by a laser and initially has a substantially circular cross-section, and wherein said lens means is further adapted for shaping said light beam to provide a substantially elliptical scanning spot and for focusing said scanning spot at a predetermined distance beyond said deflection means, whereby a locus of the focus for the elliptical scanning spot is generated as the light beam is swept from end-to-end of the scanning station; said scanning station having its ends substantially equidistantly spaced from the locus of the focus for the scanning spot and all intermediate points displaced from the locus by no more than said depth of the focus.

17. A facsimile scanner in accordance with claim 16 wherein said deflecting means includes a mirror and driver means coupled to said mirror for oscillating said mirror about a predetermined axis of rotation so that said light beam is periodically swept back and forth between the ends of said scanning station, and further including means coupled to said laser and synchronized with said driver means for stabilizing said light beam at a predetermined energy level while said beam is sweeping from one end to the other end of said scanning station and for reducing the energy of said light beam to a relatively low level while said beam is returning from said other end of said scanning station to said one end.

18. A facsimile scanner in accordance with claim 17 wherein said driver means comprises a galvanometer having a moving coil for supporting said mirror for rotation about said axis, and a periodic signal source coupled to said galvanometer coil for supplying a substantially ramp-like signal to energize said galvanometer.

19. A facsimile scanner in accordance with claim 18 wherein said subject copy is substantially opaque, and said transducer means comprises an elongated photosensitive diode extending essentially from end-to-end of said scanning station for intercepting light diffusely reflected for said subject copy in response to said scanning spot.

* * * * *